(12) United States Patent
Hill et al.

(10) Patent No.: US 11,275,629 B2
(45) Date of Patent: Mar. 15, 2022

(54) MIXED REALITY COMPLEMENTARY SYSTEMS

(71) Applicant: Microsoft Technology Licensing, LLC, Redmond, WA (US)

(72) Inventors: Erik A. Hill, Redmond, WA (US); Xiao Bai Lu, Redmond, WA (US); Brandon Kasey Harper, Woodinville, WA (US); Dylan Edmund Pierpont, Redmond, WA (US); Travis Joseph Fodor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/912,354

(22) Filed: Jun. 25, 2020

(65) Prior Publication Data
US 2021/0406094 A1     Dec. 30, 2021

(51) Int. Cl.
| | |
|---|---|
| *H04R 5/02* | (2006.01) |
| *G06F 9/54* | (2006.01) |
| *G10L 21/0356* | (2013.01) |
| *H04L 65/60* | (2022.01) |
| *H04R 3/12* | (2006.01) |
| *H04S 7/00* | (2006.01) |

(52) U.S. Cl.
CPC .......... *G06F 9/542* (2013.01); *G10L 21/0356* (2013.01); *H04L 65/601* (2013.01); *H04R 3/12* (2013.01); *H04S 7/303* (2013.01)

(58) Field of Classification Search
CPC ............... G06F 9/542; G10L 21/0356; H04L 65/601; H04R 3/12; H04S 7/303
See application file for complete search history.

(56) References Cited

U.S. PATENT DOCUMENTS

| | | |
|---|---|---|
| 10,212,517 B1 | 2/2019 | Beltran et al. |
| 10,506,361 B1 | 12/2019 | Pallamsetty et al. |
| 10,585,472 B2 | 3/2020 | Tokubo et al. |

(Continued)

FOREIGN PATENT DOCUMENTS

| | | |
|---|---|---|
| WO | 2014188393 A1 | 11/2014 |
| WO | 2019067904 A1 | 4/2019 |

(Continued)

OTHER PUBLICATIONS

Ahrens, et al., "Sound Source Localization with Varying Amount of Visual Information in Virtual Reality", In Journal of PLoS ONE, 14(3): e0214603, Mar. 29, 2019, 19 Pages.

(Continued)

*Primary Examiner* — Doon Y Chow
*Assistant Examiner* — Abdou K Seye
(74) *Attorney, Agent, or Firm* — Schwegman Lundberg & Woessner, P.A.

(57) ABSTRACT

Multiple sound systems are used to provide a realistic audio MR audio experience for one or more users. In one example, an MR space sound system has one or more speakers distributed within an MR space. MR device sound systems for users provides sound directly to the users wearing the MR devices. Audio signals representative of sound in the MR experience are mixed by each sound system to provide sounds that complement each other. Both sound systems provide sound to the users based on events occurring in the MR experience.

20 Claims, 4 Drawing Sheets

(56) References Cited

U.S. PATENT DOCUMENTS

| | | | |
|---|---|---|---|
| 2016/0104452 A1* | 4/2016 | Guan | A63F 13/35 |
| | | | 345/633 |
| 2018/0020312 A1* | 1/2018 | Visser | G06F 3/017 |
| 2018/0027349 A1 | 1/2018 | Osman | |
| 2019/0273990 A1 | 9/2019 | Sahota et al. | |
| 2019/0306652 A1* | 10/2019 | Robinson | G10L 19/20 |
| 2019/0320281 A1* | 10/2019 | Guo | G10L 19/00 |
| 2020/0382897 A1* | 12/2020 | Mindlin | H04S 7/307 |
| 2021/0084429 A1* | 3/2021 | Tajik | G06T 19/006 |
| 2021/0136509 A1* | 5/2021 | Harris | H04S 7/305 |
| 2021/0194942 A1* | 6/2021 | Kane | G06F 3/011 |

FOREIGN PATENT DOCUMENTS

| | | |
|---|---|---|
| WO | 2019161313 A1 | 8/2019 |
| WO | 20200101986 A1 | 5/2020 |

OTHER PUBLICATIONS

Xiao, et al., "Augmenting the Field-of-View of Head-Mounted Displays with Sparse Peripheral Displays", In Proceedings of the CHI Conference on Human Factors in Computing Systems, May 7, 2016, 12 Pages.

Hunt, Cale., "Howto Split Audio Between Windows Mixed Reality or VR And Pc Speakers", Retrieved from: https://www.windowscentral.com/how-split-audio-between-vr-and-pc-speakers, Feb. 23, 2018, 9 Pages.

"International Search Report & Written Opinion issued in PCT Application No. PCT/US21/027863", dated Jul. 22, 2021, 17 Pages.

\* cited by examiner

┌─────────────────────────┬─────────────────────────┐
         │        ROOM AUDIO       │         HMD AUDIO       │
         │          410            │           415           │
         │  ┌───────────────────┐  │  ┌───────────────────┐  │
         │  │ EVENT: EXPLOSION A│  │  │ EVENT: EXPLOSION A│  │
420 ─┐   │  │ FILE: EXPLOSIONROOM.WAV│ │ FILE: EXPLOSIONHMD.WAV│ │
AUDIO FILES TARGETING │ TRACKS: ROOM_AUDIO EXPLOSION│ │ TRACKS: HMD_AUDIO EXPLOSION│
ONE DEVICE TYPE       └───────────────────┘    └───────────────────┘
         │  ┌───────────────────┐  │  ┌───────────────────┐  │
         │  │ EVENT: EXPLOSION B│  │  │ EVENT: EXPLOSION B│  │
425 ─┐   │  │ FILE: EXPLOSIONFX.MP3│ │ FILE: EXPLOSIONFX.MP3│ │
AUDIO FILES WITH      │ TRACKS: ROOM_AUDIO EXPLOSION│ │TRACKS: ROOM_AUDIO EXPLOSION│
PREMIXED CHANNELS     │         HMD_AUDIO EXPLOSION │ │        HMD_AUDIO EXPLOSION │
FOR EACH DEVICE       └───────────────────┘    └───────────────────┘
         │  ┌───────────────────┐  │  ┌───────────────────┐  │
430 ─┐   │  │ EVENT: EXPLOSION: C│ │  │ EVENT: EXPLOSION C│  │
AUDIO FILE WITH ONE   │ FILE: EXPLOSIONFX2.MP3│ │ FILE: EXPLOSIONFX2.MP3│
TRACK TO BE MIXED/    │ TRACKS: AUDIO EXPLOSION│ │ TRACKS: AUDIO EXPLOSION│
FILTERED BY EACH DEVICE└───────────────────┘   └───────────────────┘
```

MIXED REALITY COMPLEMENTARY SYSTEMS

BACKGROUND

In many MR (mixed reality) experiences, a space such as a room or structure is represented digitally. MR experiences typically involve a user with an MR headset that allows a user to see both reality and virtual elements in a scanned and digitally represented MR space. Sound is usually provided by a sound system. It can be difficult to provide good quality sound during the MR experience that is perceived as realistic to one or more users in the MR space.

SUMMARY

Multiple sound systems are used to provide a realistic audio MR audio experience for one or more users. In one example, an MR space sound system has one or more speakers distributed within an MR space. MR device sound systems for users provides sound directly to the users wearing the MR devices. Audio signals representative of sound in the MR experience are mixed by each sound system to provide sounds that complement each other. Both sound systems provide sound to the users based on events occurring in the MR experience.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Attempts to provide realistic sound that is representative of a mixed reality (MR) acoustic experience have included establishing coordination between the output of volume and audio channels of the speakers of a sound system that is integrated into the space. The output of speakers in the sound system may be adjusted on the basis of a user's location or head position. Such sounds systems have limitations that prevent attainment of realistic audio in the MR experience.

In various embodiments of the present inventive subject matter, multiple sound systems are used to provide a realistic audio MR experience. In one example, an MR space sound system has one or more speakers distributed within an MR space. An MR headset sound system for a user provides sound directly to a user wearing the MR headset. Audio signals representative of sound in the MR experience in response to an event are played by each of the sound systems. In various embodiments, audio sound files may be mixed and played via one or more MR device sound systems and one or more speakers of one or more MR space sound systems.

Figure 1:
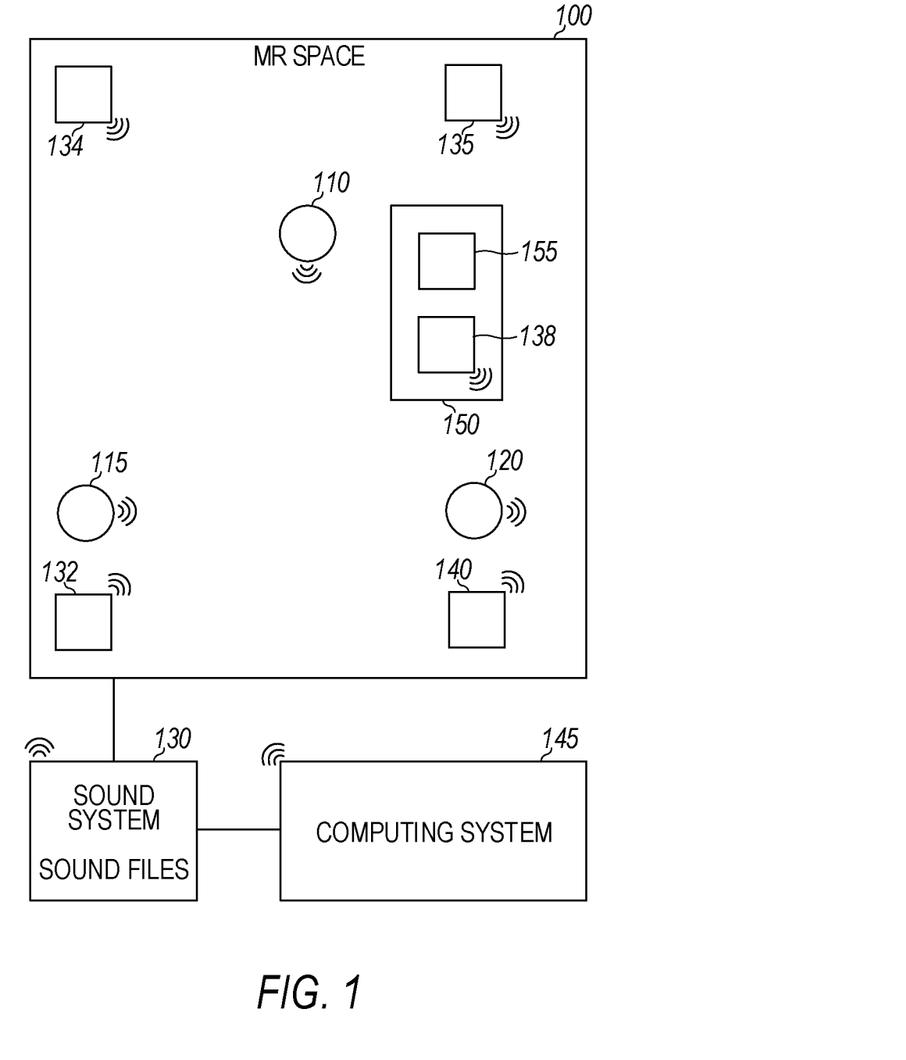
FIG. 1 is an example mixed reality (MR) space in which an MR experience is to occur according to an example embodiment.

FIG. 1 is an example MR space 100 that is digitally represented. The MR space 100 may be a room, structure, or other area in which an MR experience is to occur. A digital representation of the MR space may be created by initially using one or more MR devices 110, 115, 120 to scan the MR space 100. If the space has been previously scanned, space data may already be stored and simply retrieved to facilitate the MR experience. The digital representation of the space may be generated in many different ways and digital representations for multiple spaces may be save for various MR experiences. A space may be scanned using a device, such as a Microsoft HoloLens® 2 device, by slowly walking around the room and looking at various structures such as walls, ceiling, floor, furniture, etc.). In further embodiments, multiple devices may be used to perform the scan and collaborate to contribute geometry. Different devices, such as AR devices and other devices that may utilize LIDAR or other ranging mechanisms may be used in further embodiments. The scan comprises a geometry scan and may be performed by any device that can capture distances to objects and surfaces within a space and generate a triangle mesh representation of the space comprising the space data.

A first sound system, referred to as MR space sound system 130 includes multiple speakers 132, 134, 136, 138, and 140 disposed within or about the MR space 100. The speakers may be wired or wireless speakers in various examples. A computing system 145 is used to receive data from the MR devices 110, 115, 120 and provide processing power for the MR experience.

During an MR experience, sounds may be played via room (MR space) speakers or via each individual MR device sound system. The sounds in one embodiment comprise audio data files that are stored on one or more sound systems such as MR space sound system 130, and on each of the MR device 110, 115, 120 sound system. Each MR device sound system and MR space sound system may be networked together in a shared MR experience and have a shared understanding of the MR space and experience, such as events occurring in the MR experience as well as other data, such as user position in the MR space, user preferences, user state, user ability, ease of synchronization and other data related to the MR experience. The MR space sound system and MR device sound systems mix sound from the audio data files based on the shared understanding.

Audio data files may be distributed and pre-cached before they are required in response to an event. In further embodiments, mixing of sound may be performed in one or more central systems and streamed to the space speakers and MR device speakers. The space speakers may be wired or wireless speakers in different examples.

MR space sound system 130 may identify sound for each individual speaker to provide more realistic sound responsive to locations of a virtual sound emitting object in the MR space. In one example a table 150 may have a hologram of a map 155 or other object that may have sounds associated with it. As a user, also represented as MR device 110 interacts with the hologram map 155, map page sounds in an audio data file may be directed to speaker 138. Speaker 138 is embedded or otherwise supported by the table and located proximate the hologram map 155. The map page sounds are thus perceivable as being emitted by the hologram map 155.

The MR device 110 may also have sound files or may optionally receive sounds to play in the audio signals. The sounds originating from the table-located hologram are played through the table speakers. Ambience or sound accent audio data files (such as bullets whirring by the user's ears) may be played on the MR device 110 speakers.

In one embodiment, one of the audio systems focuses on audio coming from the hologram while the other audio system focusses on environmental/atmospheric sounds/music. This 'split channel' approach can also be applied to any sound sources. For instance, based on the location of the user provided by the user's MR device, sound from a virtual character may emit completely from the MR device 110 sound system audio files, or may emit completely from the table based on MR space sound system 130 audio files.

In one example, the MR space sound system 130 is a larger sound system suitable for playing deeper sounds, while the smaller audio system (the MR device sound system) plays the mid to high frequency sounds. This gives more depth to the sound and makes it easier to sync the experience since it is easier to sync high frequency sounds with low frequency sounds, than high frequency sounds with other high frequency sounds due to the shorter wavelength of high frequency sounds. The basic concept is like using the table speaker as a non-local communal subwoofer.

Further examples may include playing jungle or ocean sounds via the MR space sound system. Higher frequency jungle sounds may be played by the MR device sound system speakers or may be played via the MR space sound system with directional effects if a virtual or hologram bird is flying through the MR space. The splitting of sounds between the two sound systems can be very experience driven, providing great flexibility in designing an MR audio experience.

Sounds for the speakers of MR space sound system 130 may be synchronized more easily as speakers may be driven directly by MR space sound system 130. In further examples, MR space sound system 130 may be implemented as part of computing system 145. In one example, an explosion sound may be played via the MR space sound system 130, with aftereffects, such as a glass-breaking and tinkling sounds played via the MR device sound system or devices' sound systems if there are multiple users in the MR space 100.

In one example, an event may have associated audio signals that include timing information and audio file identifiers. Alternatively, one of the MR devices' sound systems could provide the audio signals. Each MR device sound system uses these audio signals to determine which audio file to play and when to play it. The audio files may be pre-stored on each of the MR devices and MR space sound system 130 or may even be downloaded in real-time in further examples. User speech may also be provided via MR device sound systems among multiple users.

Figure 2:
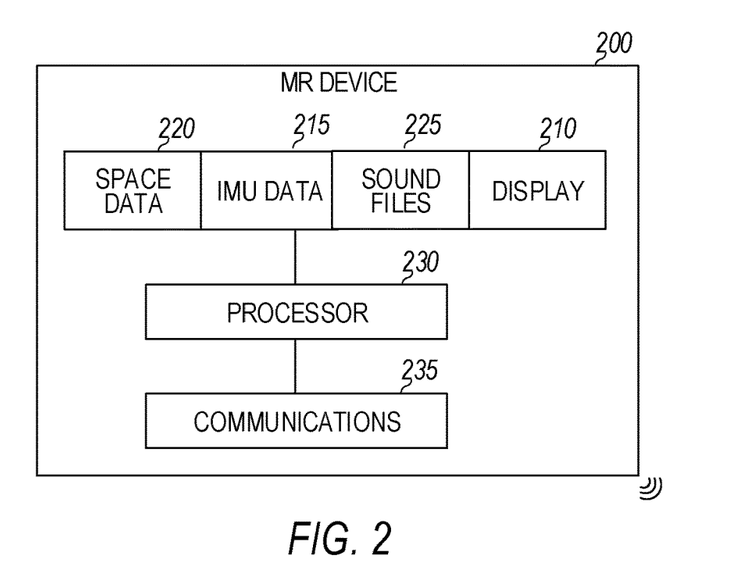
FIG. 2 is a block schematic diagram of an example MR device according to an example embodiment.

FIG. 2 is a block schematic diagram of an example MR device 200. MR device 200 is designed to be worn by a user and provides mixed reality views via a display 210. The display 210 may be a see-through display which project holographic or virtual images into the MR space. MR device 200 is used to record different types of data, such as inertial motion unit (IMU) data 215. MR device 200 also include various data records or files such as space data 220 and sound files 225. IMU data may be provided by an inertial sensor available in commercial MR headsets. IMU data generally includes data representing inertial motion in six degrees of freedom comprising motion to the left, right, forward, backward, up, and down. The IMU data allows tracking of the position of the MR device as it is being worn during the MR experience.

MR device 110 also includes a processor 230 and a communications module 235 for communicating with computing system 145 and receiving shared understanding information representative of the MR experience, and provide data to other devices, such as position information provided by IMU data 215. MR device 110 may also be configured by a user wearer to filter audio signals based on user preferences, such as volume controls, treble, base, and other audio and/or video preferences. These preferences, as well as the shared understanding information may be used by the processor 230 to perform MR device 110 sound system audio mixing functions.

Interactions between the MR device 110 and computing system 145 may be used to suppress or unlock sounds provided by the MR device sound system. For instance, in a game, such as a treasure hunt, there may be various levels of play for each user in a multiuser MR experience. At a certain level, additional sounds may be "unlocked." In other words, say at level 10, parrot sounds may be unlocked and serve as a clue to progressing to the next level. By each user's MR device performing the selection and mixing of audio files, each user can progress on their own, yet hear background jungle sounds via the first channel audio through the speakers of space sound system 130. Note that space sound system 130 will not play sounds dependent on user level unless all users have achieved a level corresponding to such sounds. The level of each user is part of the shared understanding information.

As indicated above, the ability of each sound system to select audio files and mix sound from the audio files provides the ability to select how sounds are played back and perceived in the MR space during the MR experience. While sounds and mixing at each sound system for each event can be selected ahead of time by a person programming or otherwise orchestrating the MR experience, algorithms may also be used to select sounds for each sound system based on the shared understanding information.

In one example algorithm, sounds below a selected frequency are played on the MR space sound system speakers. Sounds above the selected frequency are directed to a user's MR device speakers. The algorithm can be varied for instance based on user location and interaction with holograms within the MR space. The table speaker 138 may still be used for all the hologram map pages that are being turned even through some of the sound may be above the selected frequency. The selection of the selected frequency can be entirely arbitrary or may even be based on the relative fidelities of the speakers of each sound system. In other words, different frequency sounds are directed to the sound system on which they will subjectively sound better to users. Individual user preferences regarding amplification of selected frequency ranges may also be used to mix sounds such that they can be heard better by hearing impaired users.

In a further example, sounds from a virtual source may be mixed differently by MR device sound systems and the MR space sound system. In a jungle MR experience space, a cheetah growl may be played based on location of the user's MR device and the location of a hologram cheetah. If far away from each other in the space, the sound may be played only by the MR space sound system. If closer to each other, low frequency sound may be played by nearby MR space sound system 130 speakers with higher frequency sounds played by the user's MR device sound system. The higher frequency sounds may be synchronized with the lower frequency sounds to give the impression that the cheetah is near. This mixing of signals actually may be performed to provide location information via relative volumes and unconsciously perceivable time differences of arrival to the ears of the user.

The MR space sound system 130 audio, or space audio, may be shared in a multi-user MR experience. Mixing for the space audio can be affected by user position. For example, assume one speaker in the space with a first user and a second user. A virtual cheetah is near the speaker in the space. The first user is next to the virtual cheetah. The second user is 5 m away. The MR space sound system can only play the cheetah sound at the speaker at a level appropriate for second user to hear. The MR headset sound system for the first user near the speaker mixes audio signals to increase sound of the cheetah to compensate for the reduced volume from the room speaker. As the second user moves toward the cheetah, the volume for the shared space speaker mix increases. The first and second users' MR device sound systems adjust their private mixes to accommodate the changes in the room speaker.

Mixing by each device may also be performed based on spatially dependent audio. For instance, imagine a virtual tornado that occupies half the space. If the first user is in the tornado, but the second user is not, the speaker will need to play audio that is appropriate for the second user, while the first user's MR device compensates by mixing audio to make it sound to the first user that they are in the virtual tornado. However, if both users are inside the tornado, the MR space audio system can mix sound for the speaker that is indicative of being inside the tornado, and first user's device no longer need to compensate.

Figure 3:
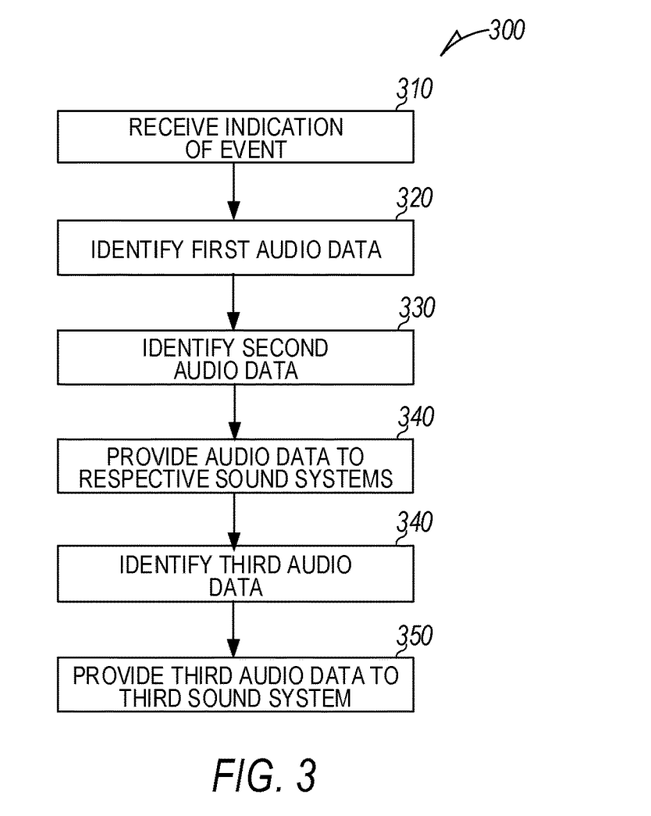
FIG. 3 is a flowchart illustrating a computer implemented method of splitting sound in a mixed reality experience between different sound systems according to an example embodiment.

FIG. 3 is a flowchart illustrating a computer implemented method 300 of splitting sound in a mixed reality experience between different sound systems. At operation 310, an indication of an event occurring during a mixed reality experience in a mixed reality space is received. Operation 320 identifies first audio data corresponding to the event intended for a mixed reality space sound system. Operation 330 identifies second audio data corresponding to the event intended for a first mixed reality device sound system of a first user. The first audio and second audio data may comprise one or more digital audio data files in one embodiment. The first audio and second audio data are provided at operation 340 to speakers in the respective mixed reality space sound system and first mixed reality device sound system.

Each sound system in one embodiment may be networked together and have a shared understanding of information regarding the mixed reality space experience, including events that are occurring. The sound systems use the shared understanding of information to mix sound from the digital audio data files to provide one or more users a better mixed reality audio experience.

The mixed reality space sound system mixes sound from the one or more first audio data digital audio data files based on the shared understanding information including one or more of the event, user positions in the mixed reality space, minimum user audio level, shared user settings, characteristics of one or more speakers, and ease of synchronization of sounds with the first mixed reality device. In some embodiments there may be multiple mixed reality space sound systems each mixing sound for one or more mixed reality space speakers.

User positions in the room may include distance/angle/orientation information in relation to holograms. User position may also be indicative of a user being within a specific area with the audio, such as the user being inside a virtual tornado or not.

Minimum user audio level relates to the room speaker playing a sound the loudest it could play for the user who would hear it the softest. If a user should not hear a specific (User A has not unlocked bird in the experience, but the other users have) this sound (bird songs) would not play through the room audio. If one user is too far away from a sound source/sound trigger area, the room speaker sound would only play at the level that the furthest person away should hear it.

Shared user settings and abilities\characteristics of the speakers of each sound system may also be used to mix sound.

In a further embodiment, ease of synchronization with MR device sound system audio may be based on ease of matching due to frequency, sound characteristics (a rumble (easy to sync) vs a short pop (hard to sync), or sounds that need minimal synchronization such as environmental sounds or background music.

The first mixed reality device sound system mixes sound from one or more second audio data digital audio data files based on mixes sound from the one or more first audio data digital audio data files based on the shared understanding information including one or more of the event, user positions in the mixed reality space, first user preferences, user state, characteristics of mixed reality device speakers, and ease of synchronization of sounds with the first mixed reality device. Other mixed reality devices of other users do the same so that each user receives an enhanced individualized audio experience.

User positions in the room may include distance/angle/orientation in relation to holograms, or if a user is within a specific area with the audio, such as being inside a virtual tornado or not.

User preferences and user state, such as a 'level three' versus a 'level ten' player may be used by each MR device sound system to mix sounds appropriate for each user's level.

Abilities\characteristics of the speakers and ease of synchronization with the room audio may also be used in a manner similar to that used by the MR space sound system.

In one embodiment, one or more digital audio data files include known premix settings for the event via separate digital audio data files or separate channels within a single digital audio data file.

Mixing of the audio data files by each sound system may be performed in many different ways depending on the mixed reality experience desired. For example, sound that is to be perceived as originating from a virtual object may be provided by one or both of the sound systems with different mixing in each sound system. Environmental sounds may be provided by one or both of the sound systems. Sound accents may be provided by mixed reality device sound systems. Sound associated with a virtual character in the mixed realty may be provided by one or both of the sound systems responsive to a detected position of respective users.

Low frequency sounds may be provided by the mixed reality space sound system and wherein higher frequency sounds may be provided by the mixed reality headset sound system for each user and may also be synchronized.

The first and second audio data comprise timing information and identifiers of one or more digital audio files that are mixed by the mixed reality space sound system and first mixed reality device respectively for the speakers.

Method 300 may also include operation 350 that identifies third audio data corresponding to the event for a second mixed reality device sound system. At operation 360, the third audio data signals are provided to speakers of the second mixed reality device sound system for a second user in the mixed reality space.

Figure 4:
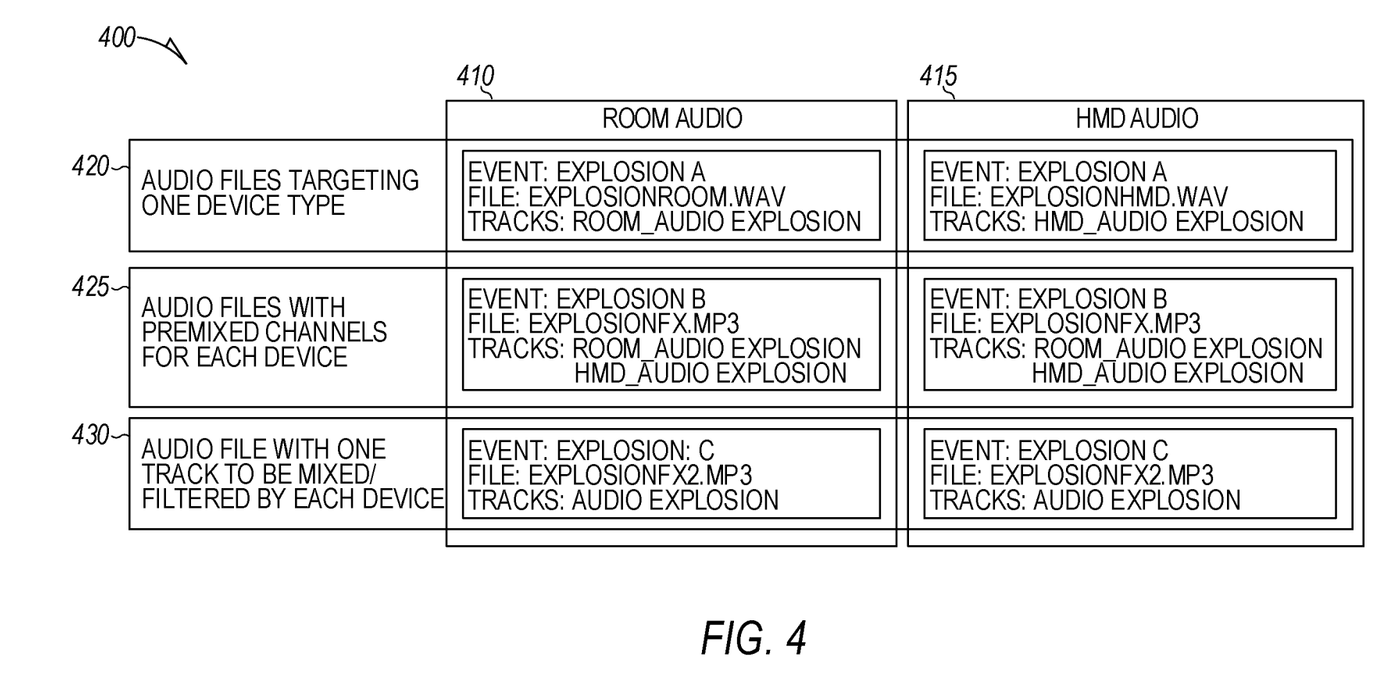
FIG. 4 is a block diagram illustrating example digital audio data files according to an example embodiment.

FIG. 4 is a block diagram illustrating example digital audio data files generally at 400 corresponding to an explosion event. Multiple digital audio data files may be indexed by the type of event. For example, there may be multiple different types of explosions, each having different digital audio data files. Three types of explosions, A, B, and C are illustrated in FIG. 4. There may also be multiple different kinds of events, each associated with one or more digital audio data files.

In one example, files corresponding to room audio, the MR space sound system, are illustrated in column 410 and files for the MR device sound system, labeled HMD (head mounted display), are illustrated in column 415. Each sound system may have the same or different digital audio data files. Some digital audio data files may have separate channels for use by each sound system in mixing the appropriate sounds for their respective speakers and some may contain a single track to be mixed by each sound system.

In one example, the digital audio data files comprise file identifiers and a time at which the file should be played. For example, in row 420, audio files targeting one type of device are shown as way files having a single track. Each of the sound systems receives a different file having a track designated for each respective sound system to play or mx and play.

In row 425, audio files that are premixed for each sound system are the same for each sound system and include an MP3 file with tracks for both room audio and HMD audio. Each sound system will play their respective track, and may optionally further mix the track.

In row 430, the audio files include the same MP3 audio file with a single track that is mixed by each of the respective sound systems.

Another example may include gunshot audio files that may be used by the sound systems for playing at a particular time. The audio file for the MR device sound system may include a whizzing sound MP3 file for creating a sound in the MR device sound system speakers corresponding to a bullet or bullets flying past the wearer while the MR space sound system plays the crack of the gunshot just prior to the bullet flying past sound.

There may be many different options for each of these files in various embodiments. These options may include different types of explosions, different numbers of bullets fired from different types of guns, as well as different sounds that bullets make when striking hologram objects.

In a further example, the sounds may be premixed and fed to one or more respective sound systems as an actual digital or analog signal for playing on sound system speakers directly as received. Some processing and/or buffering of such signals may also be performed. Audio with known premix settings can be distributed to respective sound systems. Premix setting may be implemented as separate sound files (e.g. when an explosion happens, the room audio plays a rumble (audio file 001) while the MR HMD plays a 'pop' (audio file 002)), or sound files that use separate channels to house premixed audio (in the above example, the 'rumble' and 'pop' are part of two or more different channels on a single audio file). These premixed files may undergo further mixing when played on the different sound systems based on the shared understanding, including event information.

Figure 5:
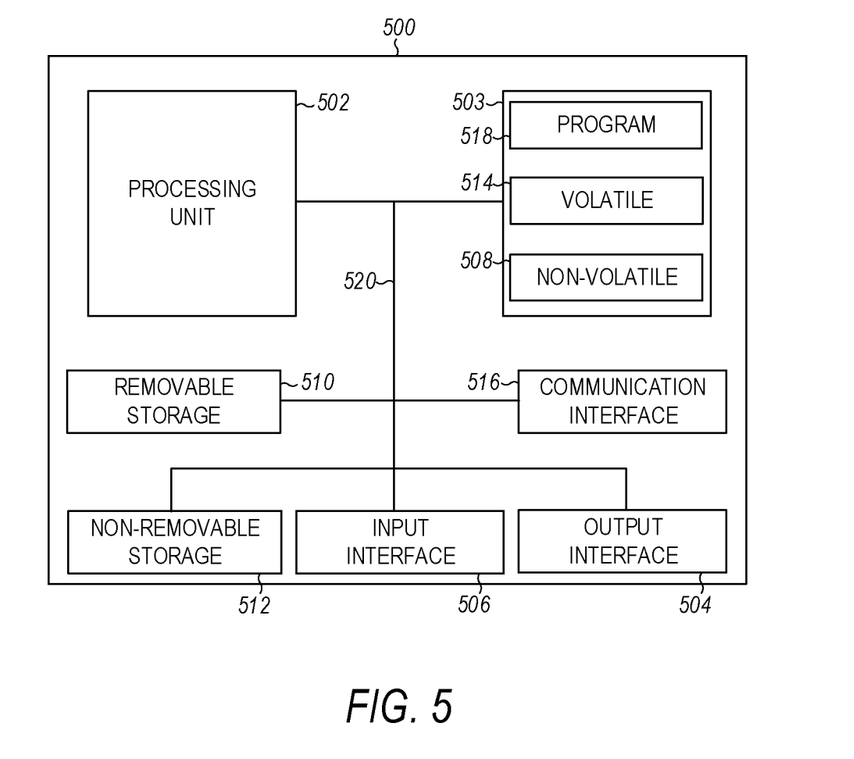
FIG. 5 is a block schematic diagram of a computer system to implement one or more example embodiments.

FIG. 5 is a block schematic diagram of a computer system 500 for use in implementing one or more devices, such MR devices, sound systems, and computing systems, and for performing methods and algorithms for mixing sound via different sound systems based on a shared understanding of the MR experience for playing on respective sound systems according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

Examples

1. A computer implemented method includes receiving an indication of an event occurring during a mixed reality experience in a mixed reality space, identifying first audio data corresponding to the event intended for a mixed reality space sound system, identifying second audio data corresponding to the event intended for a first mixed reality device sound system of a first user, and providing the first audio data and second audio data to speakers in the respective MR space sound system and first mixed reality device sound system.

2. The method of example 1 wherein each of the first audio and second audio data comprise one or more digital audio data files.

3. The method of example 2 wherein the MR space sound system mixes sound from the one or more first audio data digital audio data files based on one or more of the event, user positions in the mixed reality space, minimum user audio level, shared user settings, characteristics of one or more speakers, and ease of synchronization of sounds with the first mixed reality device.

4. The method of any of examples 2-3 wherein the first mixed reality device sound system mixes sound from one or more second audio data digital audio data files based on one or more of the event, user positions in the mixed reality space, first user preferences, user state, characteristics of mixed reality device speakers, and ease of synchronization of sounds with the first mixed reality device.

5. The method of any of examples 2-4 wherein the one or more digital audio data files include known premix settings for the event via separate digital audio data files or separate channels within a single digital audio data file.

6. The method of any of examples 1-5 wherein sound originating from a virtual object is provided by one of the first or second audio data.

7. The method of any of examples 1-6 wherein environmental sound is provided by one or both of the first or second audio data and sound accents are provided by the second audio data.

8. The method of any of examples 1-7 wherein sound associated with a virtual character in the mixed realty space is provided by one of the first and second audio data responsive to a detected position of the first user.

9. The method of any of examples 1-8 wherein the first audio data and the second audio data are filtered to complement each other.

10. The method of any of examples 1-8 wherein low frequency sounds are provided by the first audio data and higher frequency sounds are provided by the second audio data.

11. The method of any of examples 1-10 wherein the first and second audio data is synchronized while provided to the speakers.

12. The method of any of examples 1-11 wherein the first and second audio data comprise timing information and identifiers of one or more digital audio files that are mixed by the mixed reality space sound system and first mixed reality device sound system respectively for the speakers.

13. The method of any of examples 1-12 and further including identifying third audio data corresponding to the event in a second mixed reality device sound system and providing the third audio data signals to speakers in the second mixed reality device sound system for a second user in the mixed reality space.

14. A machine-readable storage device having instructions for execution by a processor of a machine to cause the processor to perform operations to perform a method. The operations include receiving an indication of an event occurring during a mixed reality experience in a mixed reality space, identifying first audio data corresponding to the event intended for a mixed reality space sound system, identifying second audio data corresponding to the event intended for a first mixed reality device sound system of a first user, and providing the first audio data and second audio data to speakers in the respective MR space sound system and first mixed reality device sound system.

15. The device of example 14 wherein each of the first audio and second audio data comprise one or more digital audio data files.

16. The device of example 15 wherein the MR space sound system mixes sound from the one or more first audio data digital audio data files based on one or more of the event, user positions in the mixed reality space, minimum user audio level, shared user settings, characteristics of one or more speakers, and ease of synchronization of sounds with the first mixed reality device.

17. The device of any of examples 15-16 wherein the first mixed reality device sound system mixes sound from one or more second audio data digital audio data files based on one or more of the event, user positions in the mixed reality space, first user preferences, user state, characteristics of mixed reality device speakers, and ease of synchronization of sounds with the first mixed reality device.

18. The device of any of examples 14-17 wherein the operations further include identifying third audio data corresponding to the event in a second mixed reality device sound system and providing the third audio data signals to speakers in the second mixed reality device sound system for a second user in the mixed reality space.

19. A device includes a processor and a memory device coupled to the processor and having a program stored thereon for execution by the processor to perform operations. The operations include receiving an indication of an event occurring during a mixed reality experience in a mixed reality space, identifying first audio data corresponding to the event intended for a mixed reality space sound system, identifying user audio data corresponding to the event intended for multiple mixed reality device sound systems of multiple users, and providing the first audio data and user audio data to speakers in the respective MR space sound system and multiple mixed reality device sound systems.

20. The device of example 19 wherein each of the first audio and user audio data comprise one or more digital audio data files, wherein the MR space sound system and the mixed reality device sound systems mix sound from the one or more digital audio data files based on the event and user positions in the mixed reality space.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving an indication of an event occurring during a mixed reality experience in a mixed reality space, the event to be experienced by a first user of a first mixed reality device in the mixed reality space;
identifying first audio data corresponding to the event intended for a mixed reality space sound system that has access to multiple digital audio data files corresponding to multiple events including at least one first digital audio data file identified by the first audio data;
identifying second audio data corresponding to the event intended for a first mixed reality device sound system of a first user the first mixed reality device having multiple digital audio data files corresponding to multiple events stored thereon including at least one second digital audio data file identified by the second audio data; and
providing the at least one first and at least one second digital audio files identified by the first audio data and second audio data to speakers in the respective mixed reality space sound system and first mixed reality device sound system.

2. The method of claim 1 wherein each of the first audio and second audio data include identifiers of multiple digital audio data files.

3. The method of claim 2 wherein the mixed reality space sound system mixes sound from the one or more first audio data digital audio data files based on one or more of the event, user positions in the mixed reality space, minimum user audio level, shared user settings, characteristics of one or more speakers, and ease of synchronization of sounds with the first mixed reality device.

4. The method of claim 2 wherein the first mixed reality device sound system mixes sound from one or more second audio data identified digital audio data files based on one or more of the event, user positions in the mixed reality space, first user preferences, user state, characteristics of mixed reality device speakers, and ease of synchronization of sounds with the first mixed reality device.

5. The method of claim 2 wherein the one or more digital audio data files include known premix settings for the event via separate digital audio data files or separate channels within a single digital audio data file.

6. The method of claim 1 wherein sound originating from a virtual object is provided by the first audio data being played through a mixed reality space sound system speaker positioned to be perceivable to the first user as being emitted by the virtual object in response to the first user interacting with the virtual object.

7. The method of claim 1 wherein environmental sound is provided by one or both of the first or second audio data and sound accents are provided by the second audio data.

8. The method of claim 1 wherein sound associated with a virtual character in the mixed realty space is provided by one of the first and second audio data responsive to a detected position of the first user.

9. The method of claim 1 wherein the first audio data and the second audio data are filtered to complement each other.

10. The method of claim 1 wherein low frequency sounds are provided by the first audio data and higher frequency sounds are provided by the second audio data.

11. The method of claim 1 wherein the first and second audio data is synchronized while provided to the speakers and wherein audio sounds corresponding to a level in a mixed reality game are suppressed by the first mixed reality device sound system until the first user reaches the level in the mixed reality game.

12. The method of claim 1 wherein the first and second audio data comprise timing information of the one or more digital audio files that are mixed by the mixed reality space sound system and first mixed reality device sound system respectively for the speakers.

13. The method of claim 1 and further comprising:
identifying third audio data corresponding to the event in a second mixed reality device sound system that has access to multiple digital audio data files corresponding to multiple events including at least one third digital audio data file identified by the third audio data; and
providing the third audio data signals to speakers in the second mixed reality device sound system for a second user in the mixed reality space.

14. A machine-readable storage device having instructions for execution by a processor of a machine to cause the processor to perform operations to perform a method, the operations comprising:
receiving an indication of an event occurring during a mixed reality experience in a mixed reality space, the event to be experienced by a first user of a first mixed reality device in the mixed reality space;
identifying first audio data corresponding to the event intended for a mixed reality space sound system that has access to multiple digital audio data files corresponding to multiple events including at least one first digital audio data file identified by the first audio data;
identifying second audio data corresponding to the event intended for a first mixed reality device sound system of a first user the first mixed reality device having multiple digital audio data files corresponding to multiple events stored thereon including at least one second digital audio data file identified by the second audio data; and
providing the at least one first and at least one second digital audio files identified by the first audio data and second audio data to speakers in the respective mixed reality space sound system and first mixed reality device sound system.

15. The device of claim 14 wherein each of the first audio and second audio data comprise one or more digital audio data files.

16. The device of claim 15 wherein the mixed reality space sound system mixes sound from the one or more first audio data digital audio data files based on one or more of the event, user positions in the mixed reality space, minimum user audio level, shared user settings, characteristics of one or more speakers, and ease of synchronization of sounds with the first mixed reality device.

17. The device of claim 15 wherein the first mixed reality device sound system mixes sound from one or more second audio data digital audio data files based on one or more of the event, user positions in the mixed reality space, first user preferences, user state, characteristics of mixed reality device speakers, and ease of synchronization of sounds with the first mixed reality device.

18. The device of claim 14 wherein the operations further comprise:
identifying third audio data corresponding to the event in a second mixed reality device sound system that has access to multiple digital audio data files corresponding to multiple events including at least one third digital audio data file identified by the third audio data; and
providing the third audio data signals to speakers in the second mixed reality device sound system for a second user in the mixed reality space.

19. A device comprising:
a processor; and
a memory device coupled to the processor and having a program stored thereon for execution by the processor to perform operations comprising:
receiving an indication of an event occurring during a mixed reality experience in a mixed reality space, the event to be experienced by a first user of a first mixed reality device in the mixed reality space;
identifying first audio data corresponding to the event intended for a mixed reality space sound system that has access to multiple digital audio data files corresponding to multiple events including at least one first digital audio data file identified by the first audio data;
identifying second audio data corresponding to the event intended for a first mixed reality device sound system of a first user the first mixed reality device having multiple digital audio data files corresponding to multiple events stored thereon including at least one second digital audio data file identified by the second audio data; and
providing the at least one first and at least one second digital audio files identified by the first audio data and second audio data to speakers in the respective mixed reality space sound system and first mixed reality device sound system.

20. The device of claim 19 wherein each of the first audio and user audio data comprise one or more digital audio data files, wherein the mixed reality space sound system and the mixed reality device sound systems mix sound from the one or more digital audio data files based on the event and user positions in the mixed reality space.

* * * * *